United States Patent [19]
Kuo et al.

[11] Patent Number: 5,405,817
[45] Date of Patent: Apr. 11, 1995

[54] V/TI MULTI-SITE OLEFIN POLYMERIZATION CATALYST

[75] Inventors: Chi-I Kuo, Humble, Tex.; Michael W. Lynch, West Chester, Ohio

[73] Assignee: Quantum Chemical Corporation, Cincinnati, Ohio

[21] Appl. No.: 17,128

[22] Filed: Feb. 12, 1993

[51] Int. Cl.$^6$ ............................................. B01J 31/00
[52] U.S. Cl. ................................. 502/113; 502/114; 502/115; 502/132; 502/133; 526/116; 526/121; 526/128
[58] Field of Search ............... 502/113, 114, 115, 132, 502/133

[56] References Cited

U.S. PATENT DOCUMENTS

| | | |
|---|---|---|
| 2,919,265 | 12/1959 | Brooks . |
| 3,029,231 | 4/1962 | van Amerongen |
| 3,030,350 | 4/1962 | de Jong et al. . |
| 3,051,690 | 8/1962 | Vandenberg . |
| 3,058,963 | 10/1962 | Vandenberg . |
| 3,144,473 | 8/1964 | Boor, Jr. et al. . |
| 3,168,484 | 2/1965 | Engel et al. ........................ 502/106 |
| 3,218,266 | 11/1965 | Ludlum . |
| 3,231,515 | 1/1966 | Ziegler et al. . |
| 3,240,773 | 3/1966 | Boor, Jr. . |
| 3,260,708 | 7/1966 | Natta et al. . |
| 3,345,351 | 10/1967 | McCall et al. . |

(List continued on next page.)

FOREIGN PATENT DOCUMENTS

| | | |
|---|---|---|
| 1151140 | 8/1983 | Canada . |
| 0314165 | 5/1989 | European Pat. Off. . |
| 0324586 | 7/1989 | European Pat. Off. . |
| 1175593 | 12/1696 | United Kingdom . |
| 785314 | 10/1957 | United Kingdom . |
| 828201 | 2/1960 | United Kingdom . |
| 1489410 | 10/1977 | United Kingdom . |
| 1582287 | 1/1981 | United Kingdom . |
| 1595992 | 8/1981 | United Kingdom . |
| WO89/01497 | 2/1989 | WIPO . |

OTHER PUBLICATIONS

Karol, et al. (1988) "Developments with High–Activity Titanium, Vanadium, and Chromium Catalysts in Ethylene Polymerization" Kaminsky and Sinn (Eds), 141–161.

Smith, et al. (1985) "Bimetallic Halides, Crystal Structure of an Ethylene Polymerization by $VCl_2.ZnCl_2.4THF$" Inorg. Chem. 24, 2997–3002.

Karol, et al. (1987) "Ethylene Polymerization with High Activity Titanium, Vanadium and Chromium Catalysts" *Book of Abstracts, 193rd ACS National Meeting, Denver, Colo.*, Apr. 5–10, 1987.

*Primary Examiner*—Asok Pal
*Attorney, Agent, or Firm*—William A. Heidrich; Gerald A. Baracka

[57] ABSTRACT

Catalysts useful in olefin polymerization are a mixture of (a) a titanium-containing compound which is (i) $Ti(Z^1)_t(OZ^2)_{p-t}$, (ii) the product of reacting $Z^3$—Mg—N(—$Z^5$)—Si($Z^4$)$_3$ or $Z^3$—Mg—N(—$Z^5$)—Si($Z^4$)$_2$—N(—$Z^5$)—Mg—$Z^3$ with $Ti(Z^1)_t(OZ^2)_{p-t}$, or (iii) the product of reacting Mg metal, Mg dihalide and $Ti(OZ^2)_4$, wherein $Z^1$ is halide, $Z^2$ is $C_{1-18}$ hydrocarbyl, p is 3–4, t is 0–p, and $Z^3$, $Z^4$ and $Z^5$ can be $C_{1-18}$ alkyl or $C_{6-14}$ aryl, and $Z^4$ can be hydrogen, and $Z^5$ can be —Si($Z^4$)$_3$; (b) one or more of $V(X^2)_c(OR^2)_{b-c}$, $VO(X^3)_d(OR^3)_{3-d}$, or $VO(X^4)_2$, wherein $X^2$, $X^3$ and $X^4$ are halogen; $R^2$ and $R^3$ are $C_{1-18}$ hydrocarbyl, b is 3–4, c is 0–b, and d is 0–3; and (c) $Zn(X^1)_2.2Al(R^1)_3$ and/or both of $Zn(X^1)_2$ and one or more of $M(R^5)_e(X^5)_{3-e}$, $Al_2(R^5)_3(X^5)_3$ or $Mg(R^6)_fY_{2-f}$, wherein $X^1$ and $X^5$ are halide, $R^1$, $R^5$, $R^6$ and $R^9$ are $C_{1-12}$ hydrocarbyl, M is Al or B, e is 0–3, Y is halide, O—($C_{1-12}$ hydrocarbyl) or $N(SiR^9_3)_2$, and f is 0–2.

25 Claims, No Drawings

U.S. PATENT DOCUMENTS

| | | | |
|---|---|---|---|
| 3,371,079 | 2/1968 | Peters et al. | |
| 3,392,162 | 7/1968 | Ziegler et al. | |
| 3,394,118 | 7/1968 | Boor, Jr. | |
| 3,457,244 | 7/1969 | Fukuda et al. | |
| 3,535,269 | 10/1970 | Tanaka et al. | |
| 3,655,583 | 4/1972 | Yamamoto et al. | |
| 3,786,032 | 1/1974 | Jennings et al. | |
| 3,899,477 | 8/1975 | Altemore et al. | 502/113 X |
| 4,008,358 | 2/1977 | Abe et al. | 502/113 X |
| 4,063,009 | 12/1977 | Ziegler et al. | |
| 4,109,071 | 8/1978 | Berger et al. | |
| 4,154,701 | 5/1979 | Melquist | 502/113 |
| 4,192,772 | 3/1980 | Berger et al. | |
| 4,202,958 | 5/1980 | Yamaguchi et al. | |
| 4,256,865 | 3/1981 | Hyde et al. | |
| 4,381,253 | 4/1983 | Shipley | |
| 4,383,119 | 5/1983 | Pullukat et al. | |
| 4,397,761 | 8/1983 | McDaniel et al. | |
| 4,426,317 | 1/1984 | Rogers | |
| 4,434,242 | 2/1984 | Roling et al. | |
| 4,435,518 | 3/1984 | Pennington et al. | |
| 4,435,519 | 3/1984 | Veazey et al. | |
| 4,435,520 | 3/1984 | Aylward | |
| 4,499,198 | 2/1985 | Pullukat et al. | |
| 4,508,842 | 4/1985 | Beran et al. | |
| 4,513,095 | 4/1985 | Speca | |
| 4,536,487 | 8/1985 | Speca | |
| 4,544,646 | 10/1985 | Pullukat et al. | |
| 4,559,318 | 12/1985 | Smith et al. | |
| 4,610,974 | 9/1986 | Speca | |
| 4,611,038 | 9/1986 | Brun et al. | |
| 4,663,404 | 5/1987 | Invernizzi et al. | |
| 4,710,552 | 12/1987 | Bachl et al. | 502/113 X |
| 4,754,007 | 6/1988 | Pullukat et al. | |
| 4,810,761 | 3/1989 | Zoeckler et al. | |
| 4,812,432 | 3/1989 | Zoeckler et al. | 502/112 |
| 4,831,090 | 5/1989 | Bachl et al. | 502/113 X |
| 4,866,021 | 9/1989 | Miro et al. | 502/113 |
| 4,918,038 | 4/1990 | Samuels et al. | |
| 5,034,483 | 7/1991 | Miro et al. | 502/113 X |
| 5,051,388 | 9/1991 | Buehler et al. | 502/113 |
| 5,079,205 | 1/1992 | Canich | |
| 5,106,805 | 4/1992 | Bailly et al. | 502/113 X |
| 5,143,882 | 9/1992 | Bueschges et al. | 502/113 |

V/TI MULTI-SITE OLEFIN POLYMERIZATION CATALYST

BACKGROUND OF THE INVENTION

1. Field of the Invention

The present invention relates to polymerization catalysts containing titanium and vanadium. The activated catalyst system produces olefin polymers having broad molecular weight distribution and multimodal characteristics. Importantly, the catalysts of the present invention permit the formation of these olefin polymers in a single stage reactor, thus avoiding problems due to undispersed polymer resin and eliminating the need for a cascade reactor system. The present invention also relates to the polymerization process using these catalysts and the polymers thus produced.

2. Description of the Prior Art

The polymerization of olefins using transition-metal based catalysts is well established in the art. Catalysts of this type which are useful in low temperature, low pressure polymerization processes—particularly those involving ethylene homopolymerization or co-polymerization, have been the subject of much research. Of special interest is the development of a catalyst which will yield a polymer with broad molecular weight distribution as manifested, for example, by a bimodal characteristic. Such a polymer would be particularly adaptable for use in high strength films and light weight blow molding resins because as molecular weight distribution broadens, i.e., as the lowest and highest molecular weights become further apart, film strength and resin processability increase.

To achieve these goals, catalysts comprised of three transition metals have been investigated. One such attempt is U.S. Pat. No. 4,710,552 which discloses a Ziegler catalyst system comprising an organoaluminum component, an organohalogen component and a transition metal catalyst component. The transition metal catalyst component involves an inorganic oxide support, a saturated alicyclic oxahydrocarbon, a vanadium trichloride/alcohol complex, a titanium trihalide or titanium trihalide/alcohol complex and, optionally, a zirconium tetrahalide.

Similarly, U.S. Pat. No. 4,831,090 provides a Ziegler catalyst wherein the transition metal component is prepared from an inorganic oxide substance (used as a carrier), an oxahydrocarbon, a vanadium trichloride/alcohol complex, a titanium trihalide or titanium trihalide/alcohol complex and, optionally, a zirconium tetrahalide. Other components include an organoaluminum and an organohalide.

The above remarks establish that there is a continuing need in the art for catalysts useful in the production of olefin polymers having a broad molecular weight distribution and multimodal characteristics in a single reactor, where the polymers thus produced have improved stereoregularity, uniform particle size distribution, good spherical morphology, and the catalysts themselves manifest excellent catalytic activity and response to hydrogen.

BRIEF SUMMARY OF THE INVENTION

The present invention is directed to a polymerization catalyst. The catalyst is especially useful in low pressure, low temperature ethylene and alpha-olefin polymerization reaction systems and produces olefin homopolymers and copolymers of broad molecular weight distribution and multimodal characteristic.

In addition, the catalyst of the present invention is highly active, resulting in a higher polymer productivity as measured by weight of polymer per unit weight of catalyst than the activity obtained by the catalysts of the prior art.

The catalyst of this invention is also characterized by ease of preparation. Because the catalyst is unsupported, additional processing steps related to the carrier, such as chemical modification or calcination, are avoided.

Also, the use of the subject catalyst allows for easy control of polymer molecular weight with the judicious addition of hydrogen.

In accordance with the present invention, a catalyst is provided. The catalyst is formed as a product resulting from admixing a titanium-containing composition, a vanadium-containing composition, and a modifier.

The titanium-containing composition is selected from the group consisting of (i) compounds of the formula $Ti(Z^1)_t(OZ^2)_{p-t}$ wherein $Z^1$ is halide and $Z^2$ is hydrocarbyl containing 1 to 18 carbon atoms, p is the valence of the Ti and is 3 or 4, and t is zero or an integer from 1 to p;

(ii) compounds formed by reacting a compound of the formula $Z^3$—Mg—N(—$Z^5$)—Si($Z^4$)$_3$ or $Z^3$—Mg—N(—$Z^5$)—Si($Z^4$)$_2$—N(—$Z^5$)—Mg—$Z^3$ with a compound of the formula $Ti(Z^1)_t(OZ^2)_{p-t}$ wherein $Z^1$, $Z^2$, t and p are as defined above and $Z^3$ is straight or branched alkyl containing 1 to 18 carbon atoms, or aryl containing 6 to 14 carbon atoms, $Z^4$ is hydrogen, straight or branched alkyl containing 1 to 18 carbon atoms, or aryl containing 6 to 14 carbon atoms, and $Z^5$ is straight or branched alkyl containing 1 to 18 carbon atoms, aryl containing 6 to 14 carbon atoms, or —Si($Z^4$)$_3$, and all $Z^3$, $Z^4$ and $Z^5$ groups are the same or different; and (iii) compounds formed by reacting magnesium metal, magnesium dihalide, and a compound of the formula $Ti(OZ^2)_4$ wherein $Z^2$ is as defined above.

Also incorporated into the admixture forming the catalytic product is one or a mixture of vanadium-containing compositions selected from the group consisting of compounds having the formula $V(X^2)_c(OR^2)_{b-c}$ where $X^2$ is halogen, $R^2$ is hydrocarbyl having 1 to about 18 carbon atoms, b is the valence of vanadium and is 3 or 4, and c is 0 or an integer from 1 to b; $VO(X^3)_d(OR^3)_{3-d}$ therein $X^3$ is halogen, $R^3$ is hydrocarbyl having 1 to about 18 carbon atoms, and d is 0 or an integer from 1 to 3; $VO(X^4)_2$ wherein $X^4$ is halogen; and mixtures thereof.

The activator can be one or both of a zinc-containing composition of the formula $Zn(X^1)_2$ and one or more aluminum compositions corresponding to the formula $Al(R^1)_3$ wherein $X^1$ is a halide and $R^1$ is a straight or branched hydrocarbyl group having from 1 to 12 carbon atoms; or the activator corresponds to the structural formula:

$$ZnX^1_2 \cdot AlR^1_3$$ 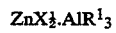

wherein $X^1$ is halide and $R^1$ is a straight or branched alkyl group having from 1 to 12 carbon atoms.

Alternatively, the activator can be a compound of the formula $$M(R^5)_e(Z^5)_{3-e}, Al_2(R^5)_3(X^5)_3,$$ 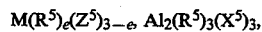

or $Mg(R^6)_fY_{2-f}$ wherein M is aluminum or boron; $X^5$ is halide; $R^5$ is a hydrocarbyl group having from 1 to 12 carbon atoms; e is 0, 1, 2 or 3; $R^6$ is a hydrocarbon having from 1 to 12 carbon atoms; Y is halide or has the formula $OR^8$ where $R^8$ is $C_1$ to $C^{12}$ hydrocarbyl, or Y is a silyl amide having the formula $N(SiR^9{}_3)_2$ where $R^9$ is $C_1$ to $C_{12}$ hydrocarbyl; and f is 0, 1, or 2. A description of compounds conforming to this definition of Y is found in U.S. Pat. No. 4,383,119, the disclosure of which is hereby incorporated herein by reference.

In another aspect, the present invention relates to a process for the polymerization of olefins, particularly ethylene homopolymerization. In the process of the invention, olefins are homopolymerized, or copolymerized, utilizing the catalyst of the present invention.

DETAILED DESCRIPTION OF THE INVENTION

The catalyst of the instant invention is a product obtained by chemically combining certain compounds of titanium, vanadium, and an activator. By "chemically combining" is meant thoroughly admixing, to produce a uniform distribution of components effective to perform as a catalyst for olefinic polymerization, or admixing under conditions or in a state (e.g. in solution) such that the components react with each other to form a reaction product having activity as a catalyst for olefinic polymerization. No specific sequence of steps is required for the admixing, nevertheless certain modes are preferred as described below.

Though not required in the practice of the present invention, a hydrocarbon solvent may be employed as a medium for the preparation of the instant catalyst. Nonpolar solvents, e.g., alkanes—such as hexane and heptane, cycloalkanes and aromatics, are preferred. If a solvent is utilized, it is preferred that the solvent is dried in order to remove water. Drying in this regard may be accomplished over molecular sieves.

In embodiments wherein a solvent is employed, it is preferred that the amount of solvent employed conform to a ratio of about 50 milliliters (mls) of solvent for about every 3 to 5 grams of catalyst. The solvent may be allowed to remain throughout preparation of the catalyst and can be removed by decantation, filtration or evaporation.

Admixing preferably occurs at or about room temperature and at or about atmospheric pressure; thus no special heating or cooling, and no pressurization or vacuum are necessary, although these may be employed without detriment. If other than simultaneous admixing is employed, no specific the period need elapse between the addition of the ingredients. If sequential admixing is utilized, however, it is preferred if about 30 minutes elapses between additions.

The titanium-containing composition preferably comprises a compound corresponding to the structural formula:

$$Ti(Y^1)_4$$

wherein each $Y^1$ is independently a halide or an alkoxy group having 1 to 12 carbon atoms. The preferred halide is chloride; the preferred alkoxy group is isopropoxy or butoxy. One highly preferred compound is $TiCl_4$. Mixtures of titanium compounds corresponding to this general structural formula may be used in the practice of the present invention.

The titanium-containing composition can be formed by reaction with compound of the formula $Z^3$—Mg—N(—$Z^5$)—Si($Z^4$)$_3$ or $Z^3$—Mg—N(—$Z^5$)—Si($Z^4$)-($_2$—N(—$Z^5$)—Mg—$Z^3$ wherein the substituent are defined hereinabove. Such compounds can be prepared as described in U.S. Pat. No. 4,499,198 and U.S. Pat. No. 4,544,646, the disclosures of which are hereby incorporated by reference. The manner of reacting these compounds with titanium compounds $Ti(Z^1)_t(OZ^2)_{p-t}$ is also described therein.

The titanium-containing composition can also be formed by reacting a titanium ester with magnesium metal and a magnesium dihalide (preferably as the hexahydrate). Titanium esters useful in this regard have the general formula $Ti(OR^2)_4$ wherein $R^2$ is a hydrocarbyl group, including but not limited to alkyl, aryl, aralkyl or alkaryl groups having 1 to 12 carbon atoms. Among the preferred titanium esters that can be used to form the composition include: tetracresyl titanate, titanium tetrabutoxide, titanium tetranonolate, tetra-2-ethylhexyl titanate, tetraisobutyl titanate, tetra-n-propyl titanate, tetraisopropyl titanate and the like. Of these, titanium tetrabutoxide, $Ti(OC_4H_9)_4$, is the most preferred.

In this embodiment of forming the titanium-containing composition, the titanium ester is combined with a magnesium dihalide having the general formula $MgX_2.6H_2O$ wherein X is halide, preferably chloride, and magnesium metal, preferably in the form of magnesium turnings. Approximately 0.05 to about 0.2 moles of magnesium dihalide, preferably 0.1 to 0.15 moles, is used per mole of titanium ester. About 0.5 to 1.0 moles of magnesium metal, preferably 0.7 to 0.8 moles, is used per mole of titanium ester. The medium used as a solvent in the precursor composition reaction is preferably formed from a mixture of highly pure isoparaffin materials, most preferably those marketed under the tradename Isopar$^R$G. Contact between the titanium ester, the magnesium dihalide, the magnesium metal, and the solvent need not occur in any particular sequence. However, it is preferred that the solvent be added last.

In this embodiment for forming the titanium composition, the titanium ester, magnesium dihalide and magnesium metal are combined and then Isopar$^R$G is added as solvent. The mixture is heated up to 95° C. for about 30 minutes, with stirring. The mixture is then allowed to stand at room temperature for a period of time in excess of 48 hours, after which time the solution is gradually heated until the reaction is completed.

The vanadium-containing compositions useful in the preparation of the catalyst of the present invention include those which correspond to the formula $$V(X^2)_c(OR^2)_{b-c} \text{ or } VO(X^3)_d(OR^3)_{3-d}$$

wherein $X^2$ and $X^3$ are halogen, preferably chlorine; $R^2$ and $R^3$ separately denote straight or branched hydrocarbyl having from 1 to about 18 carbon atoms, b is the valence of the vanadium and is 3 or 4, and c is zero or an integer from 1 to b, and d denotes 0, 1, 2 or 3. Vanadium-containing compositions useful in the present invention also include those having the formula $VO(X^4)_2$ wherein $X^4$ is halogen, preferably chloride. Mixtures of compounds corresponding to any of these formulas are acceptable. The $R^2$ and $R^3$ groups preferably have 2 to 6 carbon atoms and each is alkyl, aryl, cycloalkyl, aralkyl, or alkaryl, and more preferably is saturated. Examples of preferred compounds represented by these formulas include $VCl_3$, $VCl_4$, $VOCl_2$, $COCl_3$, $VO(isopropyl)_3$ and one or a mixture of vanadium lower alkoxy (i.e. $C_{1-6}$) halides such as vanadyl chloride butoxides.

Activator compounds useful in the preparation of the catalyst of the present invention include those represented by the general formulas $$M(R^5)_e(X^5)_{3-e} \text{ or}$$

$$Al_2(R^5)_3(X^5)_3$$

where M is aluminum or boron, $R^5$ represents straight or branched hydrocarbyl heaving from 1 to 12 carbon atoms; $X^5$ is halogen, preferably chlorine, and e is 0, 1, 2 or 3. Mixtures of compounds corresponding to the foregoing formulas are also useful. The $R^5$ group preferably has 2 to 6 carbon atoms and is preferably alkyl, cycloalkyl, aryl, aralkyl, or alkalyl, and more preferably is saturated. Examples of preferred activator compositions having this general formula include diethyl aluminum chloride (($C_2H_5)_2AlCl$), ethyl aluminum dichloride ($C_2H_5AlCl_2$), ethyl boron dichloride ($C_2H_5BCl_2$), aluminum trihalides, and boron trichloride ($BCl_3$).

The activator compound can be a zinc-aluminum complex corresponding to the structural formula:

$$ZnX^1_2 \cdot 2AlR^1_3$$

wherein $X^1$ is halide, preferably chloride, and $R^1$ is a hydrocarbyl group containing 1 to 12 carbon atoms, preferably 2 carbon atoms. In practice, the zinc-aluminum complex may be formed by reacting a zinc halide with an aluminum alkyl. The invention is not limited to any particular ratio of zinc-containing and aluminum-containing reactants, it being understood that those reactants preferentially form the complex at the indicated Zn:Al mole ratio of 1:2, with any excess of one or the other reactants remaining present. Preferably, the complex is formed by reacting about one mole of zinc chloride with about two moles of triethylaluminum; the formula of this particular complex is $ZnCl_2 \cdot 2Al(C_2H_5)_3$. The complex-forming reaction step preferably occurs separately, before contact with other material employed in forming the catalyst composition, but can occur upon addition of sufficient quantities of the zinc halide and aluminum alkyl to slurried admixtures already containing other components of the catalyst, thus forming the complex in situ. The complex thus formed in either case is soluble in non-polar solvents, such as heptane.

Other activator compositions useful in the reaction product admixture are magnesium bearing compositions corresponding to the formula $$MgR^6_f Y_{2-f}$$

where $R^6$ is hydrocarbyl having from 1 to 12 carbon atoms; Y is halogen, or has the formula $OR^8$ is hydrocarbyl containing 1 to 12 carbon atoms, or Y is a silyl amide having the formula $N(SiR^9_3)_2$ where $R^9$ is hydrocarbyl having from 1 to 12 carbon atoms and f is 0, 1 or 2. Preferably, $R^6$, $R^8$ and $R^9$ have 2 to 6 carbon atoms and are alkyl, cycloalkyl, aryl, aralkyl, or alkaryl, and more preferably are saturated. Y is preferably chlorine. Examples of such suitable auxiliary compounds include dibutyl magnesium (($C_4H_9)_2Mg$), butyl ethyl magnesium ($C_4H_9MgC_2H_5$) and butyl magnesium bis tri-methyl silyl amide ($C_4H_9MgN(Si(CH_3)_3)_2$, also known as BMSA).

Mixtures of the foregoing activator compounds may also be used in the practice of the invention.

The molar ratios preferably observed in the formulation of the catalyst of the present invention are a ratio of aluminum to (titanium plus vanadium) of about 1:1 to about 50:1; a ratio of zinc to (titanium plus vanadium) of about 0.1:1 to about 25:1; and a ratio of magnesium to (titanium plus vanadium) of about 0.1:1 to about 50:1.

The product obtained by the admixture described herein represents a first catalyst component which can be combined with a co-catalyst to form an active polymerization catalyst system. A co-catalyst useful in the practice of this aspect of the present invention includes, e.g., a metal alkyl, metal alkyl hydride, metal alkyl halide, or metal alkyl alkoxide, where the metal is aluminum, boron, zinc, or magnesium and the alkyl has 1 to 12 carbon atoms, preferably 2 to 6 carbon atoms. Mixtures of such co-catalysts, may be used with the catalyst composition. Aluminum trialkyls are preferred, with triethylaluminum and/or triisobutyl-aluminum especially preferred. Additional examples of co-catalysts include boron tri($C_{1-6}$) alkyls such as $B(C_2H_5)_3$, zinc di($C_{1-6}$) alkyls such as $Zn(C_2H_5)_2$, and magnesium di($C_{1-6}$) alkyls such as $C_4H_9$—Mg—$C_2H_5$.

The co-catalyst, when present, is present in an amount that corresponds to a ratio of co-catalyst to vanadium-containing composition of about 1:1 to 1000:1, preferably about 5:1 to about 100:1, and more preferably about 20:1 to 50:1. The vanadium-containing catalyst and the co-catalyst may be added continuously to the polymerization reactor during the course of the polymerization to maintain the desired ratio, or concentration.

In addition, during the course of polymerization, a modifier for the catalyst system may be fed into the reactor. The modifier functions to make the catalyst more active. Surprisingly, although this effect of increased activity is true for vanadium, the modifier may nevertheless poison other transition metals, if any are present in the catalyst system of the instant invention.

Modifiers, sometimes referred to as "promotors" in the art, are typically chosen for their ability to increase and maintain the reactivity of vanadium catalyst, and also affect melt index and melt index ratio (MIR), which is a measure of molecular weight distribution.

Useful modifiers include halogenating agents such as those of the formula $M^2H_iX_{j-1}$ wherein $M^2$ is Si, C, Ge or Sn (preferably Si or C, and most preferably C), X is halogen (preferably Cl or Br and most preferably Cl), i is 0, 1, 2 or 3, and j is the valence of $M^2$. Such modifiers are disclosed in Miro, et al. U.S. Pat. No. 4,866,021 (Sep. 12, 1989), the disclosure of which is incorporated therein by reference. Modifiers of this type include chloroform, carbon tetrachloride, methylene chloride, dichlorosilane, trichlorosilane, silicon tetrachloride, and halogenated hydrocarbons containing 1 to 6 carbon atoms such as those available from E.I. dupont de Nemours & Co. under the trade designation Freon (e.g., Freon 11 and Freon 113).

Bachl, et al U.S. Pat. No. 4,831,090 (May 16, 1989), the disclosure of which is incorporated herein by reference, discloses several classes of organohalogen compounds which are useful as modifiers. These include saturated aliphatic halohydrocarbons, olefinically unsaturated aliphatic halohydrocarbons, acetylenically unsaturated aliphatic halohydrocarbons, aromatic halohydrocarbons, and olefinically unsaturated halogenated carboxylates.

Particularly preferred modifiers are halocarbon compounds of the formula $R^6{}_xCX_{4-k}$ wherein $R^6$ is hydrogen or an unsubstituted or halogen substituted saturated hydrocarbon having from 1 to 6 carbon atoms; X is halogen and k is 0, 1 or 2. Examples of these halocarbon compounds include fluoro-, chloro-, or bromo-substituted ethane or methane compounds having at least two halogens attached to the carbon atom. Especially preferred modifiers include $CCl_4$, $CH_2Cl_2$, $CBr_4$, $CH_3CCl_3$, $CF_2ClCCl_3$, with the most especially preferred being $CHCl_3$ (chloroform), $CFCl_3$ (Freon 11) and $CFCl_2CCF_2Cl$ (Freon 113). Mixtures of any of these modifiers may be used.

Selection of modifiers can be used to adjust polymer properties, sometimes at the expense of activity.

Preferred polymer properties may be obtained with a chosen modifier at a ratio of modifier to transition metal which is a compromise to maximum catalyst activity. The product molecular weight distribution and response of melt index to the presence of hydrogen are tunable by choice and concentration of modifier. Activity, melt index ration (MIR), high load melt index (HLMI), etc. all vary with the ratio of modifier to transition metal, and with the choice of modifier.

The modifier utilized, when it is utilized, is present in an amount that corresponds to a ratio of modifier to vanadium-containing composition of 0.1:1 to about 1000:1 (mole:mole), preferably about 1:1 to about 100:1, and more preferably about 5:1 to about 50:1.

After the compositions selected for combination are admixed, with any desired additional components, the catalyst product thus obtained can be recovered. If a solvent has been used, the solvent is preferably removed by e.g. decantation, filtration or evaporation. If evaporation is employed, it is preferred that a nitrogen purge at a temperature of about 100° C. be utilized.

It should be appreciated that each step of the preparation of the catalyst of the present invention is preferably carried out in an inert atmosphere, such as a nitrogen atmosphere. Further, in preparing the catalyst of the invention, it is desirable that the admixing is conducted under conditions that are substantially free of oxygen. Thus in a preferred embodiment no more than 100 ppm of oxygen, based on the weight of the gaseous atmosphere is present, during catalyst preparation. More preferably, no more than 10 ppm of oxygen is present, and most preferably, no more than 1 ppm of oxygen is present, based on the weight of the gaseous atmosphere. It is also desirable that the admixing is conducted under conditions that are substantially free of water. Thus in a preferred embodiment, no more than 150 ppm by weight of water, based on the weight of the admixture, is present during catalyst preparation. More preferably, no more then 10 ppm by weight of water, and most preferably no more than about 1 ppm by weight of water is present, based on the weight of the admixture.

Another aspect of the present invention involves the use of the catalyst of the present invention in the polymerization of olefins, especially ethylene, containing up to 6 carbon atoms, to produce homopolymers and copolymers. In this process, olefins, e.g., ethylene, are polymerized under polymerization conditions in the presence of the catalyst of the instant invention.

The polymerization reaction may be conducted under solution, slurry or gas phase conditions, at temperatures of about 50° to about 250° C., preferably about 50° C. to about 110° C., and more preferably about 70° C. to about 105° C. Suitable pressures are about ambient to 30,000 psi, preferably about ambient to about 1,000 psi, and more preferably about ambient to about 700 psi.

The polymer obtained by the process of the present invention may be a homopolymer of ethylene, a homopolymer of an alpha-olefin, a copolymer of two or more alpha-olefins, or a copolymer of one or more alpha-olefins and ethylene, said alpha-olefins, as this term is used in this specification, having 3 to 12 carbon atoms. Alpha-olefins particularly useful in the present invention include propylene, 1-butene, 1-pentene, 1-hexene, 1-octene, 1,3-butadiene and 1,5-hexadiene.

Preferred polymer properties may be obtained with a chosen modifier at a ratio of modifier to transition metal which is a compromise to maximum catalyst activity. The product molecular weight distribution and response of melt index to the presence of hydrogen are tunable by choice and concentration of modifier. Activity, melt index ratio (MIR), high load melt index (HLMI), etc. all vary with the ratio of modifier to transition metal, and with the choice of modifier.

The operator may in accordance with known techniques feed controlled amounts of $H_2$ into the reaction at the beginning of the polymerization, during it, or both, to control or modify the molecular weight of the polymer product.

The polymer thus produced can have a melt index (MI) at 190° C. and 2.16 kg (as measured by ASTM D1238-82) as high as up to about 1000, including a melt index as low as about 0.01 or less. The melt index ratios (HLMI/MI) of the polymer capable of being produced will vary depending on the above parameters of HLMI and MI; for example, the HLMI/MI can be between about 25 and about 250, preferably about 30 to about 200, and more preferably about 35 to about 180. The melt index ratio correlates to molecular weight distribution (MWD). The term "HLMI" as used herein means the high load melt index as measured at 190° C. and 21.6 kg in accordance with ASTM D1238-82.

With either of the cocatalyst and modifier ratios, however, departure from the preferred values results in diminished activity and changes in polymer properties, i.e., MI and MIR. How these properties change differs with different catalyst components of the invention. Polymer properties may be tuned by varying cocatalyst and modified levels, sometimes with a compromise of activity in order to achieve desired properties.

The catalysts of the present invention are also notable in that their utilization does not require the presence of a support material, such as silica or other customary catalyst supports.

The catalysts of the present invention are also advantageous in that they provide to the user the ability to tailor the properties of the polymer that is desired. The vanadium present affords sensitivity to the presence of hydrogen added to control of the molecular weight of the polymer. Higher polymer molecular weights are associated with higher strength, whereas lower molecular weights tend to be associated with greater processability. The catalyst of this invention allows one to achieve essentially any desired balance of strength and processability.

The polymers produced by the catalysts of the do not require polymer de-ashing to be commercially acceptable in low ash polymer applications.

The catalyst systems of the present invention may be readily used under solution, slurry, or gas phase (including fluidized bed) polymerization conditions.

The following examples are given to illustrate the scope of this invention. These examples are given for illustrative purposes only, and are not intended to limit the present invention.

EXAMPLE 1

Preparation of the Titanium Precursor Composition

Into a Fisher-Porter bottle, in a dry box, was added $MgCl_2 \cdot 6H_2O$ (10.408 grams; the corresponding concentration was 0.0512 moles), magnesium metal in the form of magnesium turnings (7.290 grams; the corresponding concentration was 0.3 moles) and $Ti(OC_4H_9)_4$ (136.8 milliliters; the corresponding concentration was 0.4 moles). The mole ratio of $MgCl_2 \cdot 6H_2O$ to Mg to $Ti(OC_4H_9)_4$ was 0.128 to 0.75 to 1.0, respectively. A stir bar was also added.

Isopar$^R$G was purged with nitrogen gas for about 20 minutes before being transferred (250 milliliters) into the Fisher-Porter bottle outside the box. The total volume, in the bottle was approximately 400 milliliters.

The Fisher-Porter bottle was then heated up to 95° C. for 30 minutes under stirring. The white colored $MgCl_2 \cdot 6H_2O$ was dissolved, With most of magnesium metal remaining at the bottom of the flask. The color of the solution was clear yellow. The flask was kept at room temperature over a period of about 62 hours, after which the solution had turned dark. Some residual magnesium metal still remained.

The solution was then heated at 85° C. for 30 minutes, then at 90° C. for 30 minutes, then at 95° C. for 30 minutes, then at 100° C. for 30 minutes, then at 105° C. for 30 minutes, and finally at 125° C. for 2 hours. Afterward, the solution had a dark color; no precipitate was observed at this time. The solution was then cooled to room temperature. The final solution was observed to have a dark color with some green precipitate.

EXAMPLE 2

Preparation of Zinc-Aluminum Complex

The zinc-aluminum complex $ZnCl_2 \cdot 2Al(CH_2CH_3)_3$ was prepared from zinc dichloride ($ZnCl_2$) and triethylaluminum ($Al(C_2H_5)_3$). Heptane was used as a solvent.

Zinc dichloride (34.05 grams; the corresponding concentration was 0.25 moles) was placed into a Fisher-Porter bottle in a dry box. Triethyl aluminum (320.5 milliliters; the corresponding concentration was 0.5 moles) was subsequently added; the mole ratio of zinc to aluminum was 1:2. The solution was heated to 90° C. for 2 hours, with stirring. The mixture was then allowed to settle, and the solution was recovered for further use.

EXAMPLE 3

Preparation of $VO(OC_4H_9)_3$ 278 ml of butyl alcohol (concentration=10.8M) was added dropwise to 100 ml of a solution of $VOCl_3$ in heptane (concentration=1.0M) in a Fisher-Porter bottle. The solution, initially yellow, turned a translucent brown. The solution was heated to 60° C. for 1 hour, and then sparged with $N_2$ to remove byproduct HCl. The product concentration was 0.78M.

EXAMPLE 4

Catalyst Preparation

Into a 3-neck round bottom flask was placed 12.8 ml of a solution of $VO(OC_4H_9)_3$ prepared as described in Example 3(the corresponding concentration was 10 millimoles), and heptane (50 milliliters).

12.8 ml of a solution of $ZnCl_2 \cdot 2Al(CH_2CH_3)_3$ prepared as described in Example 2 in heptane (10 mmol Zn) was added dropwised with stirring, over 30 minutes at room temperature. The solution turned brown and a lighter brown precipitate formed.

Then 6.29 ml of a solution of ethyl aluminum dichloride in heptane (10 mmol Al) was added slowly with stirring for 30 minutes at room temperature. There was no observable change in the appearance in the flask. Then 16.2 ml of a solution of butyl magnesium bis trisilylamide in heptane (5 mmol) was added slowly with stirring for 30 minutes at room temperature. There was no observable reaction except that the solid precipitate appeared denser and darker brown, and the solution was light brown.

2 ml of a 1.0 molar solution of $TiCl_4$ in heptane was then added slowly, with stirring.

The catalyst was filtered from the flask and recovered as a dark brown powder which was washed with 150 ml of heptane 5 times.

EXAMPLE 5

Catalyst Preparation

Into a 3-neck round bottom flask in an ice bath was placed 10 ml of a heptane solution of $VO(OC_4H_9)_3$ (the corresponding concentration was 10 millimoles), and heptane (50 milliliters).

30.8 ml of a solution of $ZnCl_2 \cdot 2Al(CH_2CH_3)_3$ in heptane (24 mmol Zn) was added dropwise, with stirring, over 30 minutes at room temperature. The solution turned brown and a lighter brown precipitate formed.

4 ml of a 1.0 molar solution of $TiCl_4$ in heptane was then added dropwise, with stirring. The reaction slurry turned darker brown.

The catalyst was filtered from the flask and recovered as a dark brown powder which was washed with 120 ml of heptane 4 times.

EXAMPLE 6

Catalyst Preparation

Into a 3-neck round bottom flask was placed 32.4 ml of a solution of BMSA (the corresponding concentration was 10 millimoles), and heptane (50 milliliters).

18.9 ml of a solution of ethyl aluminum dichloride in heptane (30 mmol Al) was added slowly with stirring for 40 minutes at room temperature. A white precipitate was observed to form.

5 ml of a solution of $TiCl_4$ in heptane (5 mmol) was then added over 60 minutes, with stirring. An orange-brown precipitate was observed to form. The solution was chilled by placing the flask in an ice bath.

7.5 ml of a heptane solution of $VO(OC_4H_9)_3$ (7.5 mmol) was then ado led slowly. The precipitate was observed to turn a brownish color.

Then, 3.8 ml of a solution of ethyl aluminum dichloride (5 mmol Al) was added, and the slurry was stirred at room temperature for 30 minutes. No observable reaction occurred.

The catalyst was filtered from the flask and was washed with 125-150 (ml of heptane 3 times.

EXAMPLE 7

Catalyst Preparation

Into a 3-neck round bottom flask was placed 32.4 ml of a solution of BMSA (the corresponding concentration was 10 millimoles), and heptane (50 milliliters).

12.58 ml of a solution of ethyl aluminum dichloride in heptane (20 mmol Al) was added slowly with stirring for 30 minutes at room temperature.

5 ml of a solution of $TiCl_4$ in heptane (5 mmol) was then added over 30 minutes, with stirring.

Then, 19.23 ml of a solution of $ZnCl_2.2Al(CH_2CH_3)_3$ in heptane (15 mmol Zn) was added dropwise, with stirring, over 30 minutes at room temperature. The solution turned into a dark gray slurry, which was chilled by placing the flask in an ice bath.

7.5 ml of a heptane solution of $VO(OC_4H_9)_3$ (7.5 mmol) was then added. A precipitate was observed to form. The solution had a brownish/gray color.

The catalyst was filtered from the flask and recovered as a dark brown powder which was washed with 125-150 ml of heptane 3 times.

What is claimed is:

1. An unsupported catalyst consisting essentially of the product produced by admixing:
   (a) a titanium-containing compound selected from the group consisting of
      (i) compounds of the formula $Ti(Z^1)_t(OZ^2)_{p-t}$ wherein $Z^1$ is halide and $Z^2$ is hydrocarbyl containing 1 to 18 carbon atoms, p is the valence of the Ti and is 3 or 4, and t is zero or an integer from 1 to p;
      (ii) compounds formed by reacting a compound of the formula $Z^3$—Mg—N(—$Z^5$)—Si($Z^4$)$_3$ or $Z^3$—Mg—N(—$Z^5$)—Si($Z^4$)$_2$—N(—$Z^5$)—Mg—$Z^3$ with a compound of the formula $Ti(Z^1)_t(OZ^2)_{p-t}$ wherein $Z^1$, $Z^2$, t and p are as defined above and $Z^3$ is straight or branched alkyl containing 1 to 18 carbon atoms, or aryl containing 6 to 14 carbon atoms, $Z^4$ is hydrogen, straight or branched alkyl containing 1 to 18 carbon atoms, or aryl containing 6 to 14 carbon atoms, and $Z^5$ is straight or branched alkyl containing 1 to 18 carbon atoms, aryl containing 6 to 14 carbon atoms, or —Si($Z^4$)$_3$, and all $Z^3$, $Z^4$ and $Z^5$ groups are the same or different; and
      (iii) compounds formed by reacting magnesium metal, magnesium dihalide, and a compound of the formula $Ti(OZ^2)_4$ wherein $Z^2$ is as defined above;
   (b) one or a mixture of vanadium-containing compositions selected from the group consisting of compounds having the formula $V(X^2)_c(OR^2)_{b-c}$ where $X^2$ is halogen, $R^2$ is hydrocarbyl having 1 to about 18 carbon atoms, b is the valence of vanadium and is 3 or 4, and c is 0 or an integer from 1 to b; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen; and
   (c) one or more compounds selected from the group consisting of
      (i) compounds of the formula $Zn(X^1)_2.2Al(R^1)_3$ wherein $X^1$ is a halide and $R^1$ is a straight or branched hydrocarbyl group having from 1 to 12 carbon atoms; and
      (ii) both of a zinc-containing composition of the formula $Zn(X^1)_2$ and one or more compounds of the formula $M(R^5)_e(X^5)_{3-e}$, $Al_2(R^5)_3(X^5)_3$, or $Mg(R^6)_fY_{2-f}$ wherein M is aluminum or boron; $X^5$ is halide; $R^5$ is a hydrocarbyl group having from 1 to 12 carbon atoms; e is 0, 1, 2 or 3; $R^6$ is a hydrocarbon having from 1 to 12 carbon atoms; Y is halide or has the formula $OR^8$ where $R^8$ is $C_1$ to $C_{12}$ hydrocarbyl, or Y is a silyl amide having the formula $N(SiR^9_3)_2$ where $R^9$ is $C_1$ to $C_{12}$ hydrocarbyl; and f is 0, 1 or 2.

2. The catalyst of claim 1 wherein the titanium-containing compound is $TiCl_4$, $Ti(OC_4H_9)_4$, or mixtures thereof.

3. The catalyst of claim 1 wherein $R^1$ is alkyl, cycloalkyl, aryl, aralkyl, alkaryl or mixtures thereof.

4. The catalyst of claim 3 wherein $R^1$ is alkyl having 1 to 6 carbon atoms.

5. The catalyst of claim 4 wherein $R^1$ is —$C_2H_5$.

6. The catalyst of claim 5 wherein $X^1$ chloride.

7. The catalyst of claim 6 wherein said vanadium-containing composition is selected from the group consisting of $VCl_3$, $VCl_4$, $VOCl_2$, $VOCl_3$, $VO(iOC_3H_7)_3$ and mixtures thereof.

8. The catalyst of claim 1 wherein $X^1$ is chloride.

9. The catalyst of claim 1 wherein $R^2$ and $R^3$ are selected from the group consisting of alkyl, cycloalkyl, aryl, aralkyl and alkaryl.

10. The catalyst of claim 9 wherein $R^2$ and $R^3$ are alkyl having 1 to 6 carbon atoms.

11. The catalyst of claim 10 wherein $X^2$, $X^3$ and $X^4$ are chloride.

12. The catalyst of claim 1 wherein $X^2$, $X^3$ and $X^4$ are chloride.

13. The catalyst of claim 1 wherein said vanadium-containing composition is selected from the group consisting of $VCl_3$, $VCl_4$, $VOCl_2$, $VOCl_3$, $VO(iOC_3H_7)_3$ and mixtures thereof.

14. The catalyst of claim 2 wherein $R^5$, $R^6$, $R^8$ and $R^9$ are alkyl, cycloalkyl, aryl, aralkyl or alkaryl.

15. The catalyst of claim 14 wherein $R^5$, $R^6$, $R^8$ and $R^9$ are alkyl having 1 to 6 carbon atoms.

16. The catalyst of claim 2 wherein $X^5$ is chloride.

17. The catalyst of claim 2 wherein said compounds of the formula $M(R^5)_e(X^5)_{3-e}$, $Al_2(R^5)_3(X^5)_3$, or $Mg(R^6)_fY_{2-f}$ are selected from the group consisting of $(C_2H_5)_2AlCl$, $C_2H_5AlCl_2$, $(C_2H_5)_3Al_2Cl_3$, $(C_4H_9)_2Mg$, $C_4H_9C_2H_5Mg$, $C_2H_5BCl_2$, $BCl_3$, $C_4H_9MgN(Si(CH_3)_3)_2$ and mixtures thereof.

18. An olefin polymerization catalyst system consisting essentially of:
   A. a catalyst consisting essentially of the product produced by admixing:
      (a) a titanium-containing compound selected from the group consisting of
         (i) compounds of the formula $Ti(Z^1)_t(OZ^2)_{p-t}$ wherein $Z^1$ is halide and $Z^2$ is hydrocarbyl containing 1 to 18 carbon atoms, p is the valence of the Ti and is 3 or 4, and t is zero or an integer from 1 to p;
         (ii) compounds formed by reacting a compound of the formula $Z^3$—Mg—N(—$Z^5$)—Si($Z^4$)$_3$ or $Z^3$—Mg—N(—$Z^5$)—Si($Z^4$)$_2$—N(—$Z^5$)—Mg—$Z^3$ with a compound of the formula $Ti(Z^1)_t(OZ^2)_{p-t}$ wherein $Z^1$, $Z^2$, t and p are as defined above and $Z^3$ is straight or branched alkyl containing 1 to 18 carbon atoms, or aryl containing 6 to 14 carbon atoms, $Z^4$ is hydrogen, straight or branched alkyl containing 1 to 18 carbon atoms, or aryl containing 6 to 14 carbon atoms, and $Z^5$ is straight or branched alkyl containing 1 to 18 carbon atoms, aryl containing 6 to 14 carbon atoms, or $-Si(Z^4)_3$, and all $Z^3$, $Z^4$ and $Z^5$ groups are the same or different; and (iii) compounds formed by reacting magnesium metal, magnesium dihalide, and a compound of the formula $Ti(OZ^2)_4$ wherein $Z^2$ is as defined above;

(b) one or a mixture of vanadium-containing compositions selected from the group consisting of compounds having the formula $V(X^2)_c(OR^2)_{b-c}$ where $X^2$ is halogen, $R^2$ is hydrocarbyl having 1 to about 18 carbon atoms, b is the valence of vanadium and is 3 or 4, and c is 0 or an integer from 1 to b; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen; and (c) one or more compounds selected from the group consisting of
  (i) compounds of the formula $Zn(X^1)_2.2Al(R^1)_3$ wherein $X^1$ is a halide and $R^1$ is a straight or branched hydrocarbyl group having from 1 to 12 carbon atoms; and
  (ii) both of a zinc-containing composition of the formula $Zn(X^1)_2$ and one or more compounds of the formula $M(R^5)_e(X^5)_{3-e}$, $Al_2(R^5)_3(X^5)_3$, or $Mg(R^6)_fY_{2-f}$ wherein M is aluminum or boron; $X^5$ is halide; $R^5$ is a hydrocarbyl group having from 1 to 12 carbon atoms; e is 0, 1, 2 or 3; $R^6$ is a hydrocarbon having from 1 to 12 carbon atoms; Y is halide or has the formula $OR^8$ where $R^8$ is $C_1$ to $C_{12}$ hydrocarbyl, or Y is a silyl amide having the formula $N(SiR^9_3)_2$ where $R^9$ is $C_1$ to $C_{12}$ hydrocarbyl; and f is 0, 1 or 2; and B. a co-catalyst wherein the co-catalyst is a metal alkyl, metal alkyl hydride, metal alkyl halide, or metal alkyl alkoxide wherein the metal is aluminum, boron zinc, or magnesium.

19. The olefin polymerization catalyst system of claim 18 wherein the alkyl has 1 to 12 carbon atoms.

20. The olefin polymerization catalyst system of claim 18 wherein the alkyl has 2 to 6 carbon atoms.

21. The olefin polymerization catalyst system of claim 18 wherein the co-catalyst is triethyl aluminum, triisobutyl aluminum, or a mixture thereof.

22. An olefin polymerization catalyst system consisting essentially of
A. a catalyst consisting essentially of the product produced by admixing:
  (a) a titanium-containing compound selected from the group consisting of
    (i) compounds of the formula $Ti(Z^1)_t(OZ^2)_{p-t}$ wherein $Z^1$ is halide and $Z^2$ is hydrocarbyl containing 1 to 18 carbon atoms, p is the valence of the Ti and is 3 or 4, and t is zero or an integer from 1 to p;

(ii) compounds formed by reacting a compound of the formula $Z^3-Mg-N(-Z^5)-Si(Z^4)_3$ or $Z^3-Mg-N(-Z^5)-Si(Z^4)_2-N(-Z^5)-Mg-Z^3$ with a compound of the formula $Ti(Z^1)_t(OZ^2)_{p-t}$ wherein $Z^1$, $Z^2$, t and p are as defined above and $Z^3$ is straight or branched alkyl containing 1 to 18 carbon atoms, or aryl containing 6 to 14 carbon atoms, $Z^4$ is hydrogen, straight or branched alkyl containing 1 to 18 carbon atoms, or aryl containing 6 to 14 carbon atoms, and $Z^5$ is straight or branched alkyl containing 1 to 18 carbon atoms, aryl containing 6 to 14 carbon atoms, or $-Si(Z^4)_3$, and all $Z^3$, $Z^4$ and $Z^5$ groups are the same or different; and (iii) compounds formed by reacting magnesium metal, magnesium dihalide, and a compound of the formula $Ti(OZ^2)_4$ wherein $Z^2$ is as defined above;

(b) one or a mixture of vanadium-containing compositions selected from the group consisting of compounds having the formula $V(X^2)_c(OR^2)_{b-c}$ where $X^2$ is halogen, $R^2$ is hydrocarbyl having 1 to about 18 carbon atoms, b is the valence of vanadium and is 3 or 4, and c is 0 or an integer from 1 to b; $VO(X^3)_d(OR^3)_{3-d}$ wherein $X^3$ is halogen, $R^3$ is hydrocarbyl having 1 to about 18 carbon atoms, and d is 0 or an integer from 1 to 3; $VO(X^4)_2$ wherein $X^4$ is halogen; and (c) one or more compounds selected from the group consisting of
  (i) compounds of the formula $Zn(X^1)_2.2Al(R^1)_3$ wherein $X^1$ is a halide and $R^1$ is a straight or branched hydrocarbyl group having from 1 to 12 carbon atoms; and
  (ii) both of a zinc-containing composition of the formula $Zn(X^1)_2$ and one or more compounds of the formula $M(R^5)_e(X^5)_{3-e}$, $Al_2(R^5)_3(X^5)_3$, or $Mg(R^6)_fY_{2-f}$ wherein M is aluminum or boron; $X^5$ is halide; $R^5$ is a hydrocarbyl group having from 1 to 12 carbon atoms; e is 0, 1, 2 or 3; $R^6$ is a hydrocarbon having from 1 to 12 carbon atoms; Y is halide or has the formula $OR^8$ where $R^8$ is $C_1$ to $C_{12}$ hydrocarbyl, or Y is a silyl amide having the formula $N(SiR^9_3)_2$ where $R^9$ is $C_1$ to $C_{12}$ hydrocarbyl; and f is 0, 1 or 2; and B. a co-catalyst wherein the co-catalyst is a metal alkyl, metal alkyl hydride, metal alkyl halide, or metal alkyl alkoxide wherein the metal is aluminum, boron zinc, or magnesium; and C. a modifier wherein the modifier corresponds to the formula $M^2H_iX_{j-i}$ wherein $M^2$ is Si, C, Ge or Sn, X is halogen, i is 0, 1, 2 or 3, and j is the valence of $M^2$.

23. The olefin polymerization catalyst system of claim 22 wherein said modifier corresponds to the formula $R^6_kCX_{4-k}$ wherein $R^6$ is hydrogen or an unsubstituted or halogen substituted hydrocarbon having 1 to 6 carbon atoms; X is halogen; and k is 0, 1 or 2.

24. The olefin polymerization catalyst system of claim 22 wherein the modifier is $CCl_4$, $CH_2Cl_2$, $CBr_4$, $CH_3CCl_3$, $CF_2ClCCl_3$, $CHCl_3$, $CFCl_3$, $CFCl_2CF_2Cl$, or mixtures thereof.

25. The olefin polymerization catalyst system of claim 18 wherein the ratio of metal in the co-catalyst to vanadium in the catalyst is about 1:1 to about 1000:1.

* * * * *